United States Patent [19]

Frederiksen

[11] 4,296,930
[45] Oct. 27, 1981

[54] TV GAME APPARATUS

[75] Inventor: Jeffrey E. Frederiksen, Milwaukee, Wis.

[73] Assignee: Bally Manufacturing Corporation, Chicago, Ill.

[21] Appl. No.: 812,662

[22] Filed: Jul. 5, 1977

Related U.S. Application Data

[63] Continuation of Ser. No. 635,406, Nov. 26, 1975, abandoned.

[51] Int. Cl.³ ............................................. A63F 9/22
[52] U.S. Cl. ........................... 273/313; 273/DIG. 28; 340/725
[58] Field of Search ......... 273/85 G, 101.2, DIG. 28; 340/324 AD; 358/142; 364/200 MS File, 900 MS File, 410

[56] References Cited

U.S. PATENT DOCUMENTS

| | | | |
|---|---|---|---|
| 3,585,628 | 6/1971 | Harrison | 340/725 |
| 3,657,716 | 4/1972 | Ambrico | 340/798 |
| 3,659,284 | 4/1972 | Rusch | 340/324 A |
| 3,659,285 | 4/1972 | Baer et al. | 340/324 A |
| 3,685,039 | 8/1972 | Flanagan | 340/324 A |
| 3,716,842 | 2/1973 | Belady et al. | 364/200 |
| 3,725,563 | 4/1973 | Woycechowsky | 35/12 N X |
| 3,736,411 | 5/1973 | Berndt | 364/423 |
| 3,747,087 | 7/1973 | Harrison et al. | 340/324 AD |
| 3,760,375 | 9/1973 | Irwin et al. | 364/200 |
| 3,789,200 | 1/1974 | Childress et al. | 235/151 |
| 3,793,483 | 2/1974 | Bushnell | 273/DIG. 28 |
| 3,809,395 | 1/1974 | Allison et al. | 273/1 E |
| 3,809,868 | 5/1974 | VillaLobos et al. | 235/151 |
| 3,822,363 | 7/1974 | Moyer et al. | 340/324 AD |
| 3,826,864 | 7/1974 | Paufve | 358/104 |
| 3,872,446 | 3/1975 | Chambers | 364/200 |
| 3,874,669 | 4/1975 | Ariano et al. | 273/85 G |
| 3,895,183 | 7/1975 | Collier | 358/104 |
| 3,899,662 | 8/1975 | Kreeger et al. | 235/151 |
| 3,906,197 | 9/1975 | Grover | 235/151 |
| 3,911,597 | 10/1975 | Millard et al. | 35/12 N |
| 3,921,161 | 11/1975 | Baer | 340/324 AD |
| 3,936,664 | 2/1976 | Sato | 235/151 |
| 3,949,375 | 4/1976 | Ciarlo | 364/200 |
| 3,955,189 | 5/1976 | Thomson | 340/799 |
| 3,973,244 | 8/1976 | Lovercheck et al. | 364/200 |
| 3,978,470 | 8/1976 | McQuire | 340/798 |
| 3,980,992 | 9/1976 | Levy et al. | 364/200 |
| 3,993,861 | 11/1976 | Baer | 358/142 |
| 4,026,555 | 5/1977 | Kirschner et al. | 273/85 G |

OTHER PUBLICATIONS

Andersson, P. L.; "Phototypesetting-A Quiet Revolution"; *Datamation;* Dec., 1970; pp. 22-27.

Noll, A. M.; "Scanned-Display Computer Graphics"; *Communications of the ACM;* vol. 14; Mar., 1971; pp. 143-150.

Katjiya, J. T., Sutherland, I. E. and Cheadle, E. C.; "A Random Access Video Frame Buffer"; *Proc. of the Conf. on Comp. Graphics, Pattern Recognition & Data Structure;* May, 1975; pp. 1-6.

Denes, P. B.; "A Scan-Type Graphics System for Interactive Computing"; *Proc. of the Conf. on Comp. Graphics, Pattern Recognition & Data Structure;* May, 1975; pp. 21-24.

Knowlton, K. C.; "A Computer Technique for Producing Animated Movies"; *Proceedings AFIPS 1964 SJCC;* 1964; pp. 67-87.

Newell, M. E. and Sancha, T. L.; "A Solution to the Hidden Surface Problem"; *Proceedings of ACM Nat. Conf.;* 1972; pp. 443-451.

Denes, P. B.; "Computer Graphics in Color"; *Bell Lab Records;* vol. 52; May, 1974; pp. 139-146.

Gelernter, H. L., et al.; "An Advanced Computer-Based Nuclear Physics Data Acquisition System"; *Nuclear Instruments & Methods;* Sep. 1967; pp. 77-90.

Di Ophir, S., et al.; "Brad: The Brookhaven Raster Display"; *Communications of the ACM;* vol. 11, No. 6; Jun. 1968; pp. 415-416.

Mermelstein, P.; "Computer Generated Spectrogram Displays for On-Line Speech Research"; *IEEE Transactions on Audio & Electroacoustics;* Mar., 1971; pp. 44-47.

Bonsiepe, G.; "A Method of Quantifying Order in Typographic Design"; *The Journal of Typographic Research;* Jul., 1968; pp. 203-219.

Sutherland, I. E., et al.; "A Characterization of Ten Hidden-Surface Algorithms"; *Computing Surveys;* Mar., 1974; pp. 1-55.

*Bell Lab Record;* vol. 47; May/Jun. 1969; pp. 135–187.
Marcus, A.; "A Prototype Computerized Page–Design System"; *Visible Language;* 1971; pp. 197–210.
Noll, A. M.; "A Computer Technique for Displaying n-Dimensional Hyperobjects"; *Communications of the ACM;* vol. 10; Aug. 1967; pp. 469–473.
Kolb, E. R.; "Computer Printing Forecast for the '70s"; *Datamation;* Dec., 1970; pp. 29–31.
*Popular Electronics,* "Altair 8800"; Jan., 1975; pp. 33–38.
*Decus Proceedings;* "Spacewar: Real–Time Capability of the PDP–1"; Apr., 1962.
*Popular Electronics;* "Play Electronic Tag on Your TV"; Nov., 1972; pp. 61–65.
*Popular Electronics;* "Pontronics: Low Cost Video Game for Two Players"; Apr., 1976; pp. 35–41.
*Popular Electronics;* "Space War Game"; Apr., 1976; pp. 41–45.

*Primary Examiner*—Vance Y. Hum
*Attorney, Agent, or Firm*—Fitch, Even, Tabin, Flannery & Welsh

[57] ABSTRACT

A TV-type game employs a raster screen television for presenting game symbols. Player operated control switches are encoded to move the symbols. A microprocessor reads the switches. A dually addressed random access memory is employed as the interfacing between the screen and the processor which otherwise function as essentially separate and distinct devices. The memory provides a static storage of the screen pattern for each point in the raster lines with a portion assigned as a processor scratch pad. The memory may be dynamic with periodic refreshing and constructed with individual chips for each of the several bits in a word. The chips are grouped for alternate refreshing and powered during access periods. The processor updates the memory during idle display access periods. The memory is accessed in multiple bit words or bytes for display and processing. For display, a parallel to serial output latch is employed. The previous symbol position and pose is stored in the scratch pad and is erased and rewritten in a new position and pose. The controls may provide encoding. A hardwired bit shifter with programmed shift level rapidly shifts the symbol bits before placing in memory. A high speed memory and low speed processor are shown with separate clocks and a special synchronizer unit.

26 Claims, 8 Drawing Figures

Fig.1
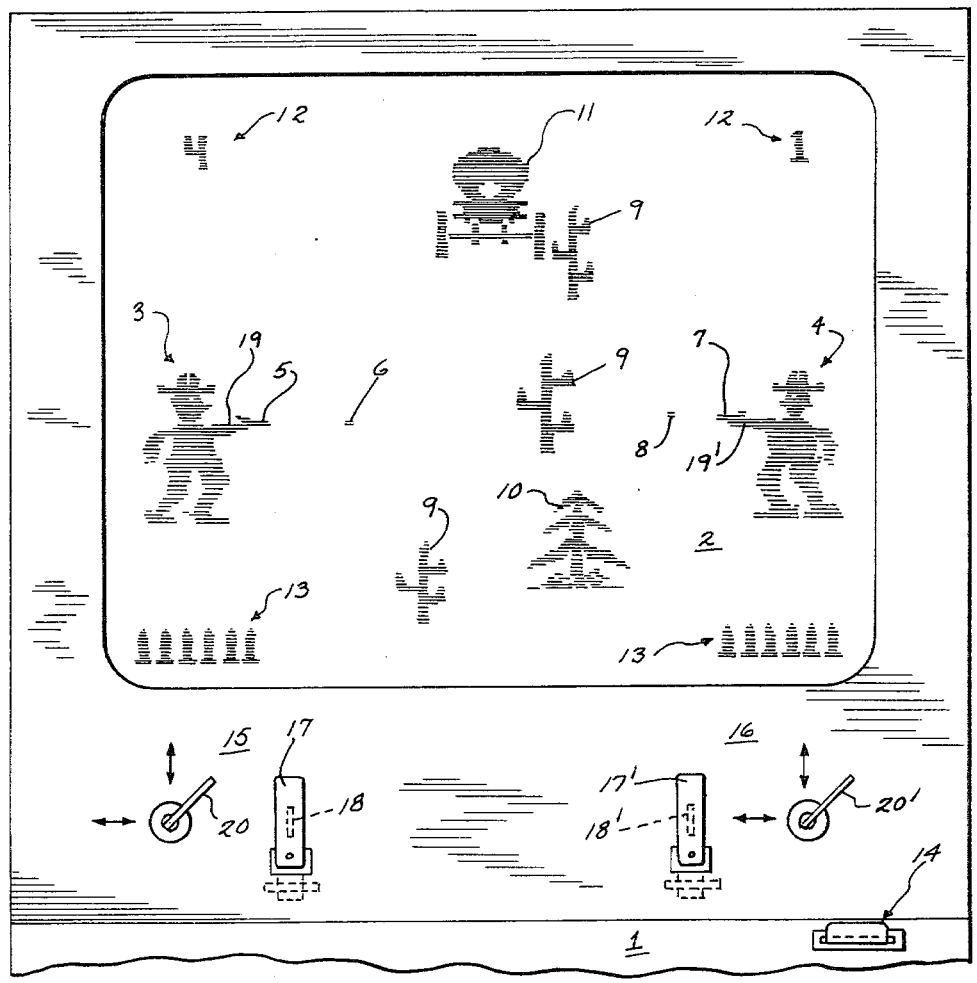
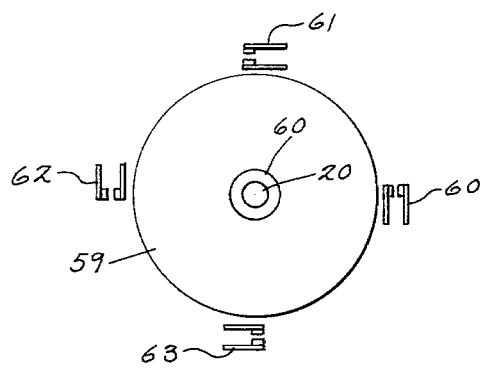
Fig.4
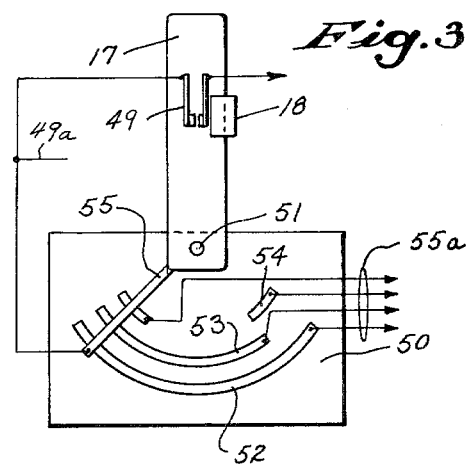
Fig.3

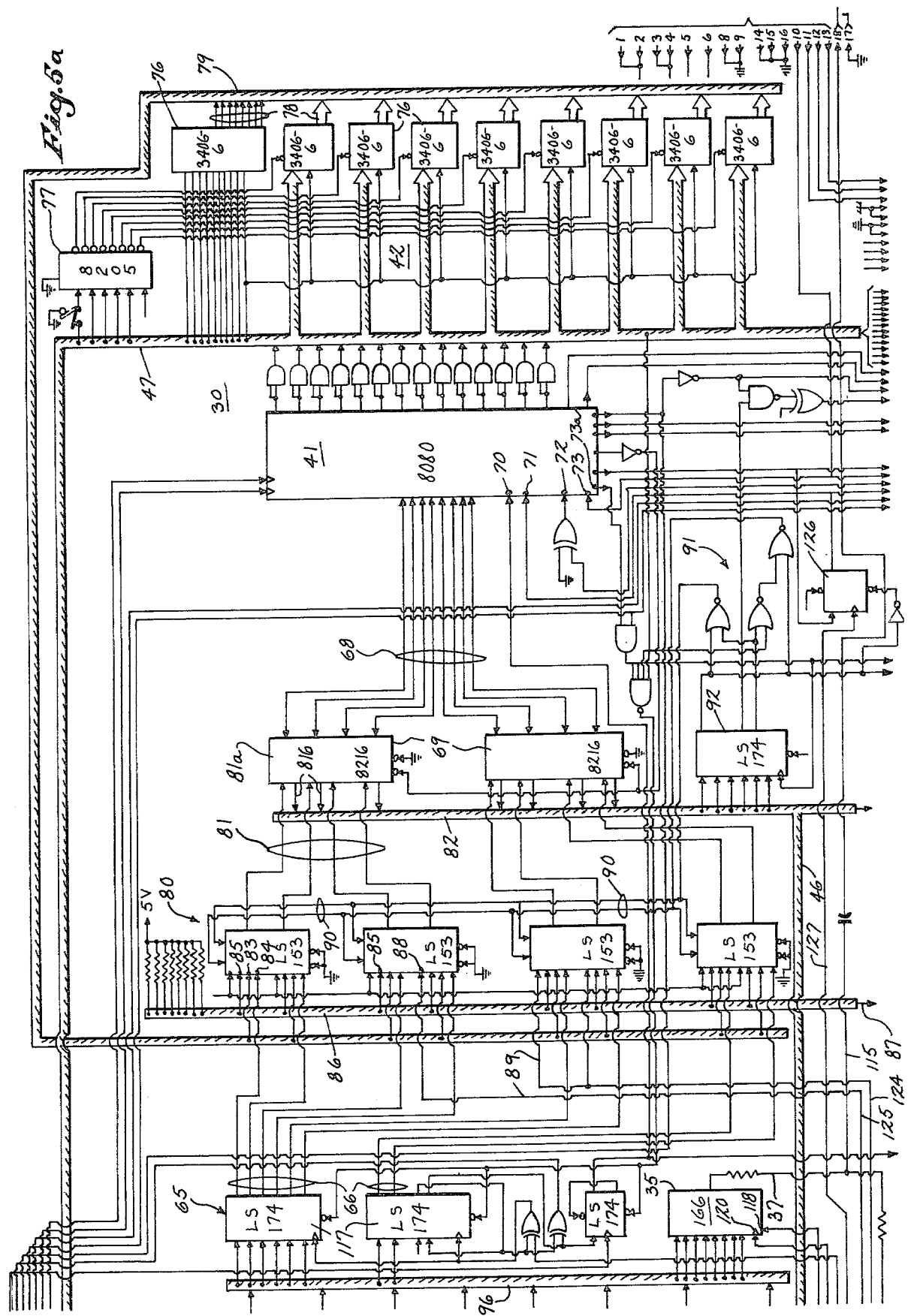

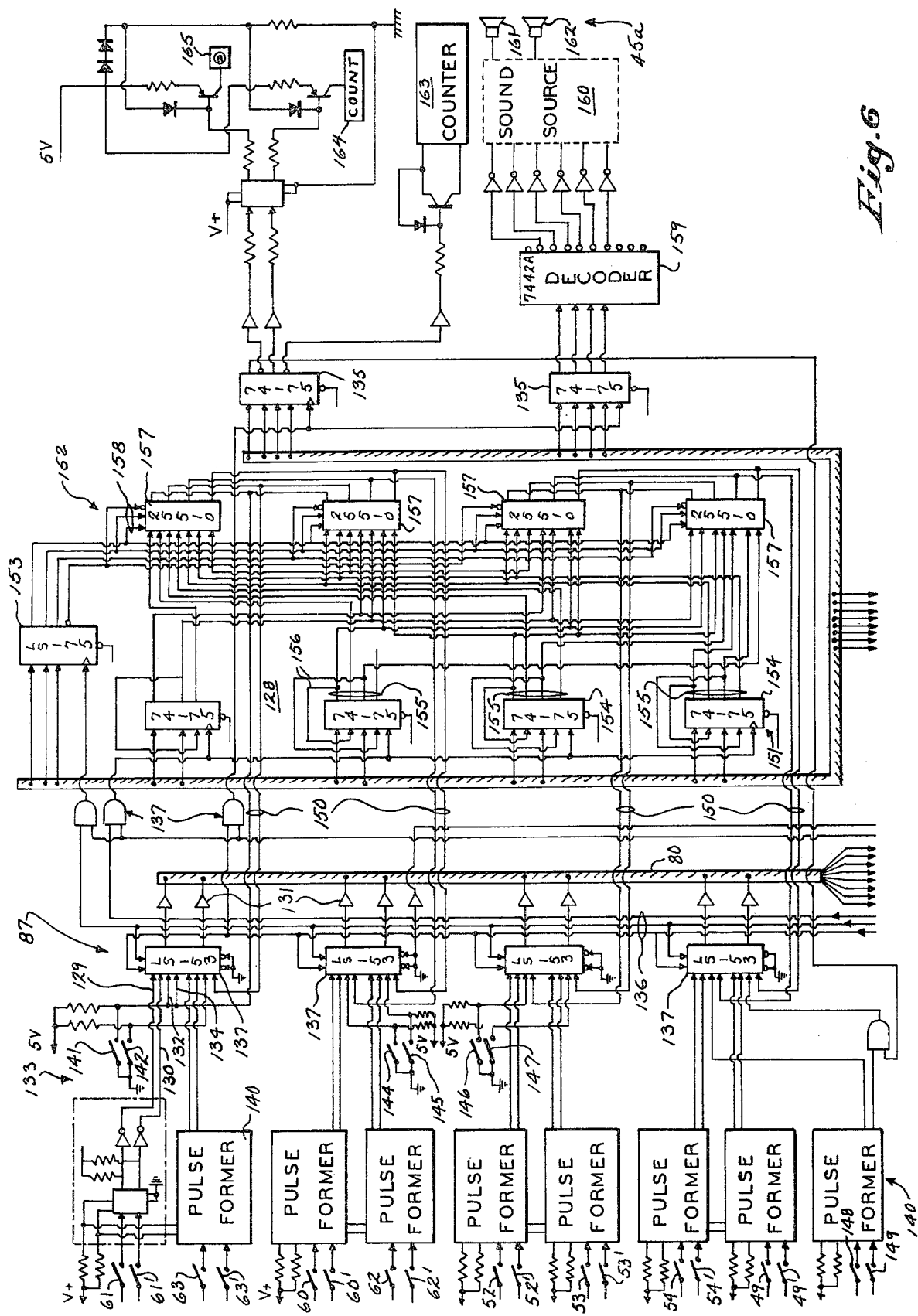

TV GAME APPARATUS

This is a continuation of application Ser. No. 635,406, filed Nov. 26, 1975, now abandoned.

This invention relates to a player operated visual game apparatus in which moving symbols appear on the screen and move in accordance with player operated input means.

In the field of game apparatus and the like, recent developments have employed TV-type devices with moving symbols for simulating playing of various competitive games. For example a widely available ping pong TV game apparatus has been developed wherein a ping pong symbol moves across a TV-type screen. The players actuate a lever control to move a small strip, to simulate a paddle, vertically along the opposite edges and if intercept is made, the ball is returned to the opposite side for similar control by the opposite player. Of course, if intercept is not made, the ball moves off the screen and a point is given to the opposite player. Other somewhat more sophisticated games have also been suggested. For example, a baseball game may be played wherein a ball is automatically thrown to a batter under proper control by the player operator. The other player operates his control to effectively bat the ball which then moves throughout the field and among a number of players. Generally, control means reposition the players, particularly around the bases in accordance with the predetermined movement of the simulated ball. Generally, the TV games are developed employing a raster type TV to mininize the cost and with black and white presentations in which various shades of gray may be produced by binary coding of the intensity drive. Simple movement is normally controlled by horizontal and vertical counters in combination with a hard wired game logic feeding into a suitable coincidence gate, the output of which controls the video signal of the display. The display unit in turn includes a conventional vertical and horizontal positioning control which, in combination with video coincidence gates, provides for the desired illumination and effective apparent movement of the symbols. Although such devices are employed, they are relatively expensive and are custom designed to each particular game. Alternatively, the particular game may be stored in a particular read-only memory system for generating of the particular symbols, with the movement and the position thereof controlled by the handwired game logic. The TV display is then actuated from a controller game logic signal to the coincidence gate. Such systems are acceptable where relatively few symbols are employed and only limited capability and control is desired. In multiple symbol-type games and where each is to move over some or all of the display field, the prior art symbol movement tends to be jerky and unrealistic. Further, the implementation of the system presents certain difficulties from a practical standpoint.

SUMMARY OF THE PRESENT INVENTION

Applicant has realized that a TV-type game is uniquely adapted to a micro processor type control if considered as comprising two basically distinct means which are separate and need be interrelated by an interfacing control memory means. In particular, the display means and the processing of the input-output signals for playing the game are two distinct and separate aspects which can be treated separately and then interfaced and that with this approach the limitation and disadvantages of the prior art approaches can at the least be minimized if not essentially eliminated. In particular in accordance with the teaching of the present invention, a dually addressed random access type memory is employed as the interfacing means to provide a static memory of the screen pattern for a raster type display means which memory is appropriately updated between display periods by a programmed processor. With this approach, every game is essentially identical and any particular game is created by proper program and control of the memory bank which is interconnected by interfacing means to the TV display means and to the processor means. The processor means includes a central processing unit with a preset program memory and suitable input-output interfacing means. In a preferred construction the raster TV display means has priority and includes means to scan the display memory bank for display of the information to present a visual display related to the particular game with idle time during retract periods and other unique blanking periods. During the period the TV display means is accessing the memory bank, the processor is monitoring and polling its memory and the associated input-output devices and conditioning itself to execute the necessary input-output to the memory bank. Thus, during horizontal and vertical retrace and other periods depending on the particular raster display, the display means is not accessing the memory bank. During such TV access idle periods, the processor read-writes into the display memory bank completing the necessary pattern changes in accordance with the player operator related inputs. The processing unit, by providing sufficient processing time, may be a relatively slow speed unit with the processor communicating with the dually addressed memory bank during the TV idle time or periods.

The present inventor in particular recognized that this limitation permited approaching and treating the overall system as two distinct devices or means with time sharing of the memory bank as a completely acceptable and practical implementation of an interfacing control and approach to a TV-type game display and one which is uniquely adapted to practical implementation.

Generally, to particularly employ relatively slow and inexpensive programmed processors, Applicant employs various display techniques for raster TV display means which permit slow speed processing while maintaining excellent visual presentation of the characters and the desired related movement. The various techniques may be employed as required to provide the necessary processing time. Generrlly, in addition to the horizontal and vertical retrace idle periods, the TV display means reads the memory in a parallel multiple bit byte, stores the total byte with the several bits of the byte then serially outputted to appropriately drive the intensity of TV display scanning beam for each display point or location. The serial output is a TV idle period during which the CPU can communicate with the memory means. A highly practical image presentation has been found which employs only alternate frames of the conventional interleaved scan lines. Further, sufficient realistic display is obtained with scanning lines arranged to create multiple spaced line symbols. A single random access memory is employed with a number of addresses assigned to the processor. This permits the use of such portion of the random access memory means as a scratch pad for use by the CPU. In addition, the memory means is preferably sectionalized into vertical screen sections for updating of the symbols within a given section after display of the symbols for the corresponding sections. The processor then begins to update a completed scanned section during the scanning of the subsequent sections.

Further, the several symbols to be visually displayed are individually formed within a given framework and assigned a corresponding block of the memory means. The central processing unit monitors the position of each symbol and, in updating the memory means, only changes that part of the memory means in which an actual change has been commanded by the user operated input.

For example, in a particular gunfighting game developed for two players, relatively large symbols are employed for the shooters and associated environmental elements such as buildings, plants, vehicles and the like. These can be identified in program by appropriate bytes corresponding to the block of memory, with the CPU required to store a reference dot or location for each symbol. When any particular symbol is to be updated, the CPU locates the reference points, erases the symbol and rewrites the proper changed symbol. Where the symbols used are relatively large, the pattern may require use of successive bytes to update the symbol. If the symbol bytes are not superposed on the screen bytes or move within a byte, the data bits must be shifted into appropriate display bytes in the memory unit to properly drive the display means. To provide processor controlled shifting is time consuming and practically requires a relatively high speed unit. In accordance with a further aspect of the optimum embodiment, the inventor provides a separate hardwired shifter with programmed amount of shift. For example, in an 8 bit word or byte, the shifter may be programmed to shift up to seven bits. The shifter in a particular practical implementation includes a pair of data word latches to store successive bytes and select the appropriate bits from the two bytes to form an appropriate display word for driving the TV beam.

Certain changes in the symbols may be user controlled in response to the player control means while others may be machine determined in response to the change created as a result in the response to the player control means. For example in a gunfighter game, the shooting and direction of the bullet is user determined. The response to engagement of the bullet with an obstacle or other gunfighter is programmed. For example, engagement with the obstacle may remove a part of the obstacle whereas engagement with the other gunfighter may cause the symbol to fall.

To facilitate the speed of a change of a portion of a symbol related to a particular input, the processing system may employ an encoded input control which the CPU decodes and directly positions that portion of the symbol. For example, in the gunfighting game, the shooter's arm may be assigned a selected number of distinct raised and lowered positions. The operated control for positioning the arm includes a multiple contact or other suitable encoding means to detect the operator setting of the control. The encoding means is wired to set a register or the like which is then read by the CPU and the shooter's arm appropriately placed when next updating of that shooter symbol.

In summary, Applicant has realized, as a result of analysis, the high speed requirements associated with the two aspects of the system can be eliminated and that consequently the processor can, in fact, be a relatively slow speed unit while maintaining a complete and accurate presentation of a moving display in a low cost high speed raster screen type display. This teaching is very significant in the commercial implementation of TV game devices.

In a highly practical system, a relatively high speed memory means may be combined with a relatively low speed processor. Individual clock means are coupled to the memory means and to the processor with a special synchronizer unit to maintain proper stepped time relationship between the display means and the processor with each of the devices operating at full capability.

In accordance with a further aspect of this invention, the random access memory means is preferably of the dynamic type employing relatively low cost storage cells which are periodically refreshed. In order to minimize the power consumption, the memory means is constructed with the individual chips for generating of the several bits arranged in a plurality of groups which are alternately refreshed. Thus, the cycle time may be readily created whereby each group is refreshed within the memory hold peiod. Further, during the periods that the memory means is not communicating with the associated devices, the clock driver is disabled. This further minimizes the total power consumption. As a result, the memory chips operate at very low temperature and in practice may run essentially cold.

In particular in accordance with a unique embodiment of the present invention, certain moving symbols such as the gunfighter may have a plurality of different poses which can be presented to more realistically simulate particular movements. The processor in updating of the random access memory for the display screen remembers information in order to properly determine and introduce subsequent new data information into the data bank of the memory for presentation of the appropriate pose. Thus, the previous display information is employed to transmit a true moving characteristic of the symbol. For example, the shooter movement must be related to the immediate previous movement to maintain a smooth, effective, realistic motion.

Thus by storage of the previous position and presentation, the central processing unit can accurately determine the next position and by appropriate synchronization with the TV scan establish the desired smooth transfer of the bat symbol or any other symbol on the screen.

More particularly, in a preferred and novel embodiment of the present invention, a conventioal raster screen television display is employed with a conventional horizontal and vertical count means interconnected with a clock means to generate the desired position or address control in combination with the necessary sync and blank signals to the TV-video input. The output is connected through an interfacing high speed random access memory of 65,536 bits to provide a unique memory position for each of 57,344 dots of the conventional TV screen, generated by a frame consisting of 256 by 224 lines.

In accordance with the further aspect and novel construction of a preferred embodiment, the remaining 8,192 bits of the random access memory bank is employed as the scratch pad for the use by the central processing unit and the associated portion of the display is blanked. The TV control system controls access to the memory bank on a 50 percent duty cycle with equal periods for accessing of memory for display and for CPU data reduction and updating. The game processor includes a suitable central processing unit driven from a separate time clock in combination with a read-only memory for controlling the necessary sequences and subroutines for a particular game. The necessary input-output peripheral devices such as switch input signals are decoded and processed and encoded outputs provided for generating the necessary and auxiliary visual and audible supporting sounds. Each symbol is formed within a given block of memory locations which is so many bytes wide and so many lines high and each change in a symbol is completed by erasing of the memory block and rewriting of the block with the new or revised symbol. The TV screen and display control and the central processing unit are multiplexed to the random access memory to control the read-write of the random access memory, with the processor particularly connected through a data-latch system to read the information in the memory for determining the last position of the symbols and the like as well as being connected to introduce data into the memory to rewrite the symbol. The input-output devices are interconnected to the central processing unit and the TV clock provides the necessary interrupt for updating of the symbols in accordance with the player activated inputs. Thus, a multiplexer includes switch inputs for reading the user or player control setting with each symbol read out as a group and it includes other inputs for reading the memory means.

The particular symbols and game to be played will be continuously stored in the CPU program memory with the direct memory access being continuously updated to appropriately display the symbols to provide a smooth appearing continuous movement of the symbols in a more or less realistic presentation.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings:

FIG. 1 is an illustration of a TV game apparatus with character presentation in accordance with programmed processor control for describing an embodiment of the invention;

FIG. 3 is a diagrammatic view of first player operated control means for controlling the movement of the symbols on the screen of the TV game apparatus;

FIG. 4 is a view similar to FIG. 3 illustrating a second control means for the first player and providing for additional control of the movement of the symbols;

FIGS. 5 and 5a are a schematic circuit illustrating a basic programmed processor board for developing of the game mode of display; and FIG. 6 is a schematic circuit illustrating a particular game logic board for coupling of the game information to processor board circuit for completing of the circuit for a particular game shown in FIGS. 1-4.

DESCRIPTION OF THE ILLUSTRATED EMBODIMENT

Figures 2, 4A:
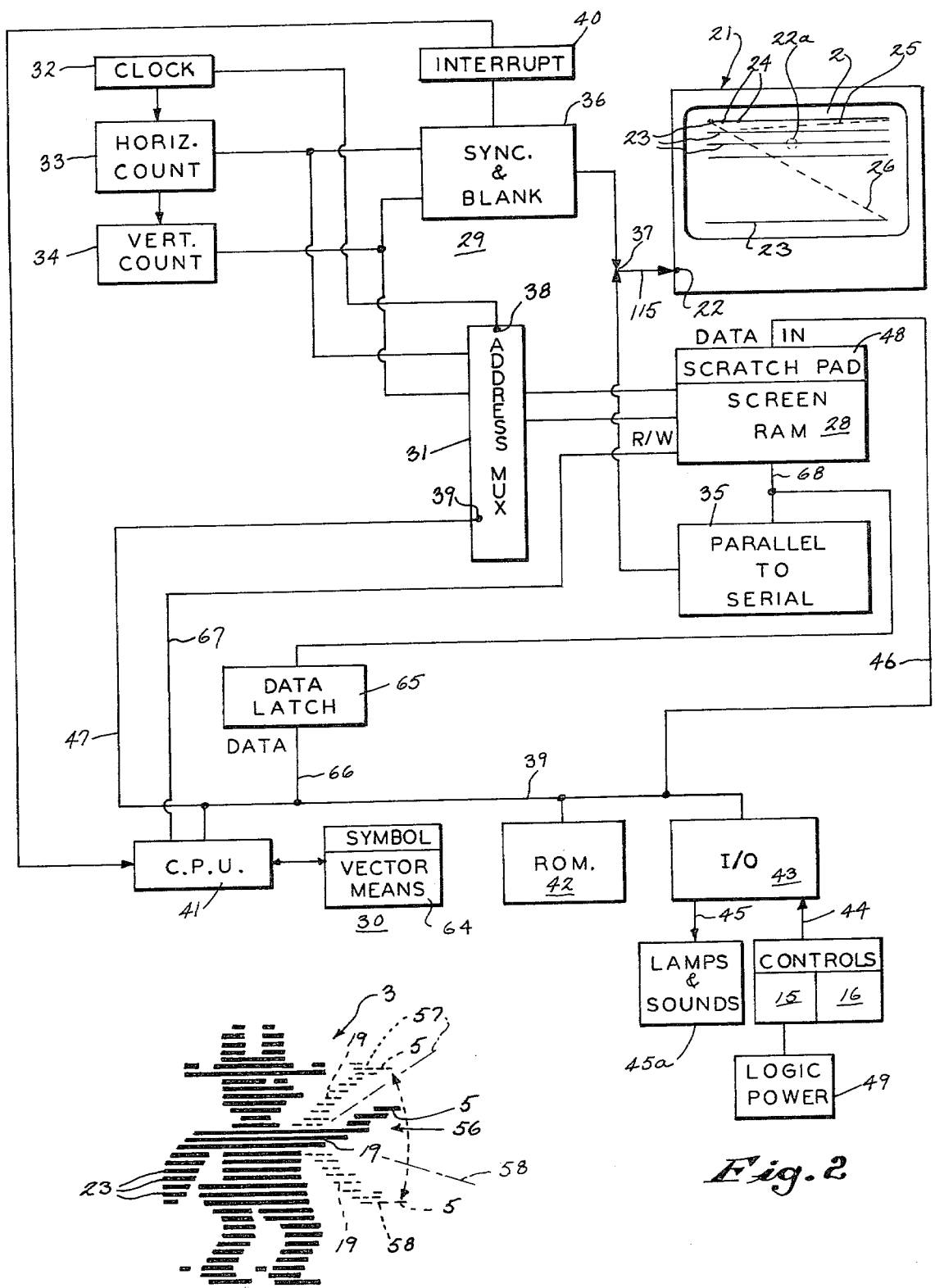
FIG. 2 is a block diagram illustrating the display and display generating components of a preferred embodiment of the present invention.
FIG. 4a is a view of one of the symbols shown in FIG. 1, with various alternate programmed poses of the symbols shown in phantom.

Referring to the drawings and particularly to FIG. 1 game apparatus is illustrated including an outer housing 1 with a visual display screen 2 for the presentation of the play of a gunfighter game by a pair of players, represented by first gunfighter 3 and a second gunfighter 4 located to the right and left sides of the screen. The viewing screen 2 includes a suitable background field which is shown for purposes of showing one possibility as a simplified western landscape. The gunfighter 3 includes a gun 5 for shooting of bullet 6 across the screen. The gunfighter 4 similarly includes a gun 7 for shooting a bullet 8 toward the opposite shooter. Obstacles are positioned between the gunfighters 3 and 4, and are shown including a plurality of cactus and trees 9 and 10 adjacent each of the gunfighters 3 and 4 and a centrally located wagon 11 which can move vertically across screen 2, as more fully developed hereinafter. The gunfighter 3 and 4 may be identified by a suitable legend, not shown, and hits identified as at 12 at the top of the screen 2. The available bullets may also be identified by bullet illustration 13 on the bottom of the screen. The apparatus may, in accordance with known game devices, have a coin control means with a coin slot input 14 to initially activate the game. First and second sets of manual controls 15 and 16 are provided to the exterior of the housing 1 immediately below the display screen for each of the players.

For the gunfighter game, the control 15 for gunfighter 3 includes a trigger handle 17 including a trigger 18 which is operative to activate the viewing screen 2 to shoot a bullet 6 from gun 5. Handle 17 is also pivotally mounted for moving of the shooting arm 19 of the gunfighter 3 for corresponding positioning of the gun. The player may thereby direct the bullet angularly upwardly or downwardly. Control 15 further includes a joy stick lever 20 which is mounted for universal horizontal pivoting to mvoe the gunfighter vertically and horizontally on screen 2.

The controls 16 for the second player are similarly constructed and identified by corresponding primed numbers. Thus, control 16 include the gun handle 17' with trigger 18' and a joy stick lever 20' for corresponding actuation and positioning of the second gunfighter 4.

The several controls 15 and 16 include encoding means for generating signals to a programmed processor game circuitry, as more fully described hereinafter.

In the play of the game, each player is allotted the same number of bullets 6 and 8 with a set game time in which to shoot the opposite gunfighter. Each player actuates his lever 20-20' to move his gunfighter 3-4 to avoid being hit and to position himself to shoot the opposite gunfighter. The handle 17-17' and trigger 18-18' are actuated to position the gunfighter's arms 19-19' and to move a bullet 18-18' across the screen 2 for hitting of the opposite gunfighter.

The present invention is particularly directed to the method of implementing the presentation on the screen 2 and the response to the available player controls 15 and 16 to accurately visually display the game and in particular to create movement of the players in an interesting and generally realistic manner such as to simulate running movements and the like. Further, as presently described, the invention is particularly addressed to the development of a single programmed system which can be rapidly, conveniently and inexpensively constructed to any other game. For example, the programmed processor game circuitry, as presently described for the gunfighter game may be readily adapted and converted to present a baseball or football game by modifying of the viewing screen to present an appropriate playing field with the appropriate players positioned thereon for controlled movement and adapting the encoding means to directly control movement or to create machine assisted and determined movements with the same or other manual controls.

More particularly and referring to FIG. 2, a block diagram illustrating a preferred and novel construction of the present invention for general universal application to different games is illustrated wherein the screen 2 forms a part of any conventional raster scan television unit 21 having a video and sync input 22 for receiving of the appropriate sync signals and beam illumination signals for generating of the appropriate display such as that shown in FIG. 1 on the screen. Generally, a raster TV unit 21 includes a scanning beam 22a which is continuously moved across the screen 2 in a plurality of horizontal scanning lines 23, each of which consists of a plurality of points 24 for illumination to generate the symbols or patterns 3, 4 and the like. During the retrace of the scanning beam 22 from the end of one line 23 to the next, the beam 22 is blanked, as shown by the retrace line 25. At the end of the bottom scan line 23, the beam 22 is again blanked for the vertical retrace, shown by the vertical retrace line 26. In a conventional TV unit, successive frames of scan lines for each picture have the scan lines 23 interleaved to increase the resolution of the display. Thus, the TV unit 21 may be any conventional raster scan type unit. As more fully developed hereinafter, in the illustrated TV game apparatus of this embodiment, the scan frames are not interleaved to display the symbols, which therefore are drawn with a plurality of spaced brightened portions of the scanning lines 23. Consequently, no further description of the TV unit 21 which may be any well-known or desired construction and may be readily found in the prior art is given other than as necessary to clearly explain the present invention. The prior art may be referred to by the ordinary worker for reference purposes and details of construction of a TV unit.

Generally, in accordance with the present invention, the video signal applied to the input 22 is derived from a random access screen memory unit 28 employed as the interfacing between the screen display means and the game display control means which otherwise function as separate and distinct functional devices. A sync generating and display control unit 29 reads the memory unit 28 and combines the stored data with a TV sync signal for display of the stored material as a static presentation of the view stored in memory. The view in memory unit 28 is written by an integrated program processor 30 during periods when the memory unit 28 is not required by the display cycle, which periods are generally defined as idle time or periods in this description. In particular, the random access screen memory unit 28 is sutiably connected for joint but separate or individual communication with the display control unit 29 and processor 30. In the illustrated embodiment an appropriate multiplexer unit 31 is employed.

The random access memory unit 28 is selected of such a size to correspond to and completely store the information necessary for presentation of a complete display and illumination of the TV screen 2. For example, the TV unit may be arranged with a dot pattern of 256 by 224 and requires a memory unit 28 on the order of 57,344 bits. Such a random access memory 28 is of course readily available and will completely store the information necessary for illumination dot in a conventional raster type TV unit 21.

A TV control clock unit 32 drives a horizontal line counter 33 and a vertical position counter 34 which define the position of the scanning beam 22a on the screen 2. The horizontal and vertical counters 33 and 34 define a first address means connected by the multiplexer 31 to address the memory unit 28 for sequential reading of the memory locations or points. The memory unit 28 reads in suitable multiple bit bytes, each of which thus defines the state of a series of points in a scan line 23, and are connected by a parallel to serial latch unit 35 to the common input 22 of the TV unit 21. A sync blank unit 36 is also driven from the TV counters and combined with the video signal as at 37 for connection to the common input and thereby establishes synchronism between the readout of the locations of memory unit 28 in accordance with the position of the beam 22a on screen 2.

The TV clock or source 32 is also connected to the select input 38 of the multiplexer 31 to establish priority coupling of the memory unit 28 to the TV unit 21, and to selectively activate the multiplexer 31 to connect a processor bus 39 to the memory unit 28.

The sync and blank unit 36 and the select input 38 to the counter are synchronized to allow the processor 30 to communicate with the memory unit 28 for calculation and updating of the screen display during display reading idle periods when the TV display system is not addressing and reading the memory unit 28. A logic circuit 40 is also coupled to the sync and blank unit 36 to further generate interrupt signals during such idle periods and set appropriate flags or the like, not shown, in the processor 30 to communicate with the memory unit 28 for rewritting of the symbols or patterns.

Generally, the processor 30 includes a central processing unit (CPU) 41 which functions in a programmed sequence under the control of a programmed memory 42, which is illustrated as a read-only memory. As input-output buffer interface device 43 includes an input bus 44 for coupling to the player operated control elements or controls 15 and 16 and an output bus 45 for energizing of suitable auxiliary visual and sound devices 45a associated with the game apparatus 1. The central processing unit 41 of the processor is also connected by a display update bus 46 to the RAM 28 and to the input-output interface device 43. An address bus 47 is connected to the address multiplexer 31 to selectively establish and control communication with RAM unit 28. The central processing unit 41 cycles through its program under the control of the read only memory 42 to continuously monitor and poll the condition of the control elements 15-16 which includes suitable condition encoding means. The program memory 42 further includes the necessary programs to vary the display or the point illumination data stored in the RAM memory 28 in accordance with the encoding means as set by activation of the controls 15-16.

The processing unit 41 further requires a scratch pad memory to complete the data reduction. In the illustrated embodiment of the invention, a portion 48 of memory unit 28 is employed for such memory. Thus, the memory map for the processor includes the RAM program memory which may consist of 8000 addresses each of which includes an eight bit byte. The scratch pad may include the next 1000 addresses and the screen or RAM memory the next 7000 addresses. The processing unit 41 starts at the initial address and then proceeds to process the various game I/O means to control the play and response of the game to the input controls.

Referring to FIG. 3, the trigger handle 17 encoding means includes a switch 49 coupled to the trigger 18. The switch 49 completes a circuit from a logic power supply 49a to the I/O unit and when read by the CPU 41 causes shooting of one bullet 6 across the screen 2. The direction is encoded by a three bit logic code generated by pivoting of the trigger handle 17, as follows. More particularly, a coding disc 50 is coaxially mounted adjacent the handle support pivot 51 and includes three radially spaced concentric contact segments 52, 53 and 54. Fixed contacts 55 are secured to the handle 17 and slidably engage the contact segments 52, 53 and 54 in response to rotation of the handle 17. The fixed controls 55 and aligned contact segments are separately connected to the signal voltage supply 49a and by leads 55a the I/O unit to correspondingly open and close the circuit for reading by the CPU 41. The pivoting of the handle 17, generates seven three bit code combinations, defined by combinations of the open and closed circuits each of which corresponds to a particular position of the shooter arms 19, including a horizontal position 56 and two raised and two lowered positions 57 and 58, as shown in FIG. 4a.

Similarly, the gunfighter 3 movement is encoded by the "joy" stick control 20. Referring to FIG. 4, in the illustrated embodiment a control disc 59 is secured to the pivot shaft 60 of the control. The lever 20 projects through the disc 59 and pivoting of the shaft 60 moves the disc 59 to selectively close four equicircumferentially distrubuted switches 60, 61, 62 and 63. The latter switches are related to cause the associated gunfighter 3 to move in the corresponding direction. Thus, each switch 60–63 is connected between the control voltage supply 49 and the I/O unit to provide corresponding individual control singals. The CPU 41 again reads each switch line and correspondingly calculates the repositioning of the gunfighter symbol 3 from the present position. Thus, if the right hand switch 60 in FIG. 4 is closed, the gunfighter 3 is to move to the right. The CPU 41 correspondingly erases the symbol 3 and rewrites the symbol in the appropriate shifted memory block of memory unit 28. If both the upper and right switches 60 and 61 are closed, the gunfighter 3 should move upwardly at an angle to the right. The CPU 41 calculates the appropriate location of the memory bank to directly generate the angularly oriented movement from the existing position, and in particular selects the gunfighter data to be placed in a corresponding block of the RAM unit 28.

Referring particularly to FIG. 2, the player operated control means 15 and 16 establish bianry logic signals which are read by the CPU 41 and the symbols 3 correspondingly rewritten in memory unit 28. The patterns or symbols are programmed in the CPU program memory with suitable vector means 64 for presenting of the movable patterns in various positions or poses. For example, the gunfighter 3 and 4 may move vertically, horizontally and angularly. The speed of movement may be incorporated in the program to provide a single walking or running movement which may also change during the play of the game, if desired. The gunfighter writing program includes a plurality of different programs in which the gunfighter 3 is written in different poses such that by sequential invoking of the available programs causes the gunfighter to appear to realistically walk or run from one position to another. Thus, the vectoring means for each appropriate symbol includes means to store the last program written into the random access memory unit 28 and the location of the memory block by storing of the coordinates identifying the location of the symbol reference dot. At the next calculation and updating, the symbol is completely erased from the memory unit 28, and rewritten with the appropriate program and relocated in the appropriate memory block corresponding to the block of TV dots to be illuminated by the scanning beam. The vector means 64 for the symbol stores the new location and last program written to remember the pose. The TV control unit 21 subsequently reads out such memory locations to correspondingly and properly energize the beam 22 within the screen block.

Thus, in a practical sequence, the CPU program 42 includes the sequence of monitoring the player operator controls 15 and 16 for the symbols and then sequentially updating each symbol 3 and 4 in response to generation of an update interrupt signal.

The symbols in the illustrated embodiment of the invention include the gunfighters 3 and 4 which are programmed for three poses including a fixed standing position and second and third positions with the legs positioned forwardly and rearwardly to move realistically across the screen. The movement of the gunfighters 3 and 4 are determined by the player operated controls. In addition, the symbols may be machine changed in response to selected game occurrences such as shooting of an opponent gunfighter. For example, the gunfighter 3 may be caused to lay down in a horizontal position if shot by the opposing shooter 4. In addition, the wagon 11 is caused to move vertically across the screen by successive writing in appropriately shifted memory blocks in accordance with an internal program. Thus, the wagon 11 is rewritten during each complete cycle updating. Further, a bullet 6 shot through an obstacle such as the cactus 9 or 10 may cause the upper portion to be removed from the screen 2. In the latter case, the beam 22 may be directly blanked for erasing of the upper portion. If the wagon 11 is struck, the upper portion is removed directly, and then, because the wagon 11 is rewritten each update cycle, is replaced. Thus, the wagon 11 blinks off and on when hit. The central processing unit 41 in particular reads the encoding means and executes the appropriate software program, addressing via the bus 47 the appropriate random access memory 28 for transfer of data over data input bus 46 to the memory unit 28.

The screen display is rewritten periodically to simulate the presentation of actual movement on the fighting field in a realistic and interacting manner. In order to accomplish this result, the characters are, as just described, not only moved throughout the field but are activated to simulate the movements associated therewith; for example, during running motion the legs are moved and for directing of the bullet the arms move to resposition the gun. In accordance with the present invention, the previous position and arrangement of a symbol is stored temporarily in a temporary storage means prior to rewriting of new symbol and activation of the TV display accordingly. In the present embodiment the processor stores the necessary reference data in its scratch pad memory.

In particular, in FIG. 2, a data latch 65 is connected to the parallel memory data output bus to receive data bit information corresponding to the data in random access memory 28 for the addressed location. The tri-state data latch unit is coupled via a connecting bus 66 to the central processing unit bus 41 for communication therewith which interprets the information for proper storage and rewriting of the symbol.

The selection of reading of the data in memory unit 28 or writing of data into memory is controlled by the central processing unit 41 through a read data select line 67 which is connected to the memory unit 28.

Each symbol employed is a fixed size and thus defined within a block of memory unit 28. The processor program memory includes a software program which completely rewrites the symbol within the assigned block size. In updating of a symbol, the processor erases the block of memory and completely rewrites the symbol in a new similar block to correspondingly move the symbol and simultaneously reposition the symbol in whole or in part in accordance with the programs in the program memory unit 28. As more fully developed hereinafter, the present invention preferably employs relatively low speed processor 30 for purposes of economy. The readout of a memory byte to the TV unit from the parallel to serial latch 65 develops an idle period while the bits are serially transmitted to the TV unit 21. The processor time for completing all the tasks necessary to properly interpret the input controls 15 and 16, the present symbol positions and the new positions as well as the game conditions, is created by providing a fifty percent duty cycle in which the TV display means and the processor alternate in accessing of the random access memory 28 both during the scan lines and during the horizontal and vertical retrace periods of the scanning beam which are of course idle periods during which the CPU 41 may use memory unit 28. The duty cycle is maintained during such periods to maintain a simple and inexpensive system. Further, by accepting the horizontal line illustrating of the symbols 3, 4, 9, 10 and 11, the circuitry and particularly the interrelated simplified controls are maintained. The addresses of the screen memory unit 28 which would be associated with scan lines is not employed to store display data but rather is employed as a scratch pad memory for the processor 21.

Thus, the random access memory unit 28 provides the dual functioning of storing a complete screen display over the operative portion, with the portion 48 employed in order to properly manipulate and calculate the necessary data for updating of memory unit in accordance with operation of the player operated controls and corresponding changing of the view on screen 2.

Generally in accordance with the present invention, the display control unit 29 initiates generation of a display frame and completes display of the information in memory unit 28 to establish one complete static visual presentation or picture. In the illustrated system, during one display generating frame, the processor 41 monitors the status of the input-output controls 15 and 16 and during the idle periods accomplishes the various data reduction and calculation tasks in the RAM necessary to reflect the action ocurring. During a subsequent frame, the processor 30 updates the symbol by erasing and rewriting of the symbols. In practice, where a few large symbols are used, a single symbol is updated during an update frame period. This is particularly satisfactory where the various symbols may not require simultaneous movement of all or a significant member thereof and thus a series of frames may be generated before updating of the several symbols.

In summary, the TV unit 21 is driven to display the static image of the memory unit 28, with the rapid frame presentation, creating a typical live presentation of the stored image. The TV control unit continuosly and cyclically generates the frames essentially as a separate and distinct entity to produce the presentation and during the selected idle periods when he memory unit 28 is not needed releases the memory unit 28 to the processor. During such periods, the memory unit 28 and particularly the scratch pad memory may be addressed by the CPU 41. The display memory section or portion of the memory unit 28 is updated periodically in response to interrupt signals generated by the TV control unit during the period of the alternate update frame. The present invention may of course employ a suitable TV control means and processor which are adapted to communicate with the random access memory unit 28.

Figure 5:
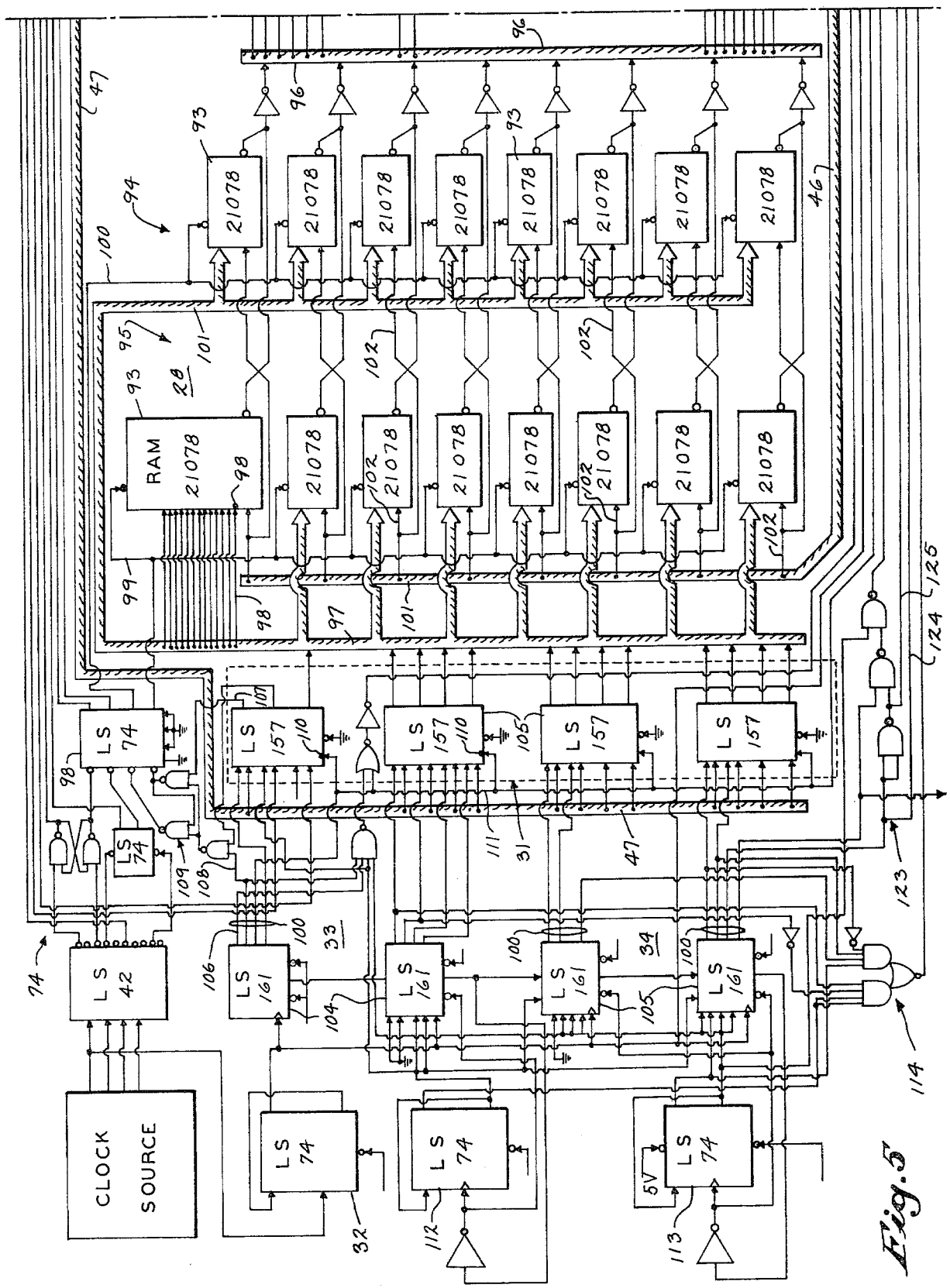

Although various systems may be employed to implement the present invention, a particularly unique and practical system is shown in FIGS. 5-6.

FIGS. 5, 5a and 6 illustrate schematic circuits of the elements shown in FIG. 2 particularly adapted for the gunfighter game. Generally, in FIGS. 5-5a a processor system is shown which may be constructed as a universal basic circuit which is essentially adapted to be programmed for each game, with only the program memory of the processor changed to each particular game. Such program memory may of course employ commercially available program chips of the plug-in variety. An interfacing circuit, which is constructed for each particular game, is shown in FIG. 6.

In a practical implementation of the present invention the two basic circuits are therefore constructed on individual circuit boards, with the processor board forming a generalized board construction, and with the game logic board being uniquely and separately constructed for each game.

In the illustrated embodiment of FIG. 5 the processor 30 includes the central processing unit (CPU) 41 having an address bus 47 connected to the program memory unit 42 and having a read-write data bus 68 connected to a CPU multiplexer 69 for receiving and transmitting of binary data words. The CPU 41 may be an Intel 8080 with the appropriate control input terminals including a ready 70, an interrupt 71, a hold 72, a reset 73 and a request 73a. The 8080 processor 30 particularly employs 8 bit data words or bytes in communicating with the associated control and memory devices and a 16 bit address word or byte. The associated buses are correspondingly data and address bus lines. The CPU 41 is driven from a suitable clock unit 74, (FIG. 5). The operating sequence of the central processing unit is controlled by the program memory unit 42 which is preferably a suitable programmable is read-only memory system such as that sold by the Intel Company and may include a plurality of memory chips 76, such as Intel 3604-6. The memory chips are suitably configured and interconnected to define the necessary software program control and further include suitable routing for writing of the several symbols as well as reading of the player control means and other control means and executing of appropriate programs. Each of the chips 76 is connected by address bus 47 to a decoder unit 77 for selecting one of the memory units 76 for readout. The decoder 77 is connected to the bus 47 with individual output lines to the several chips 76. The program memory chips 76 each has eight lines 78 coupled to a common instruction bus 79 and the appropriate eight bit instruction word is transmitted in accordance with the address word aplied from the CPU 41 to the decoder 77 and the chips 76. The instruction bus 79 is hardwired to one of four inputs of a four to one multiplexer or decoder 80, shown consisting of four 74LS153 chips. The output of the decoder 80 is connected to one input 81 of the CPU input-output multiplexer unit 69 shown consisting of a pair of Intel 8216 chips 81a. The multiplexer unit 69 has an output bus 82 connected to memory bus 46 and to I/O circuit shown in FIG. 6. The multiplexer unit 69 includes input-output lines 68 connected to CPU data ports and provides for transfer of data to and from the CPU 41.

The decoder 80 in addition to the instruction input 83 includes a RAM input 84 connected to the output of the RAM memory unit 28. The second input to the decoder 80 provides for transfer of one byte from the RAM memory 28.

A third input 85 to the decoder 80 is connected to the game logic lines bus 85 from a game data multiplexer 87, a shown in FIG. 6, for inputting of the encoded signals from the I/O unit 43.

The fourth input 88 to the decoder 80 is connected to a pair of interrupt signal lines 89 from the TV clock control assembly 32-34. The interrupt signals are generated to instruct the CPU 41 to update one of the symbols, as more fully described hereinafter.

The decoder 80 includes a pair of binary selection lines 90 connected by a logic circuit 91 to the output of a status register 92 which continuously is in a state corresponding to the state of the CPU 41. The status register is connected to the data bus 82 and thus is set by the CPU 41 to create the necessary output control state.

The memory unit 28 (as shown in FIG. 5) is a random access memory and for purpose of economy and practical implementation of the present invention are preferably constructed as dynamic memory units such as those manufactured and sold by Intel Corporation with the identifying number Intel 2107B. The memory cells are generally capacitor cell units which must be periodically refreshed in order to maintain the memory data. The memory unit as illustrated includes 16 memory chips 93 which are divided into eight bit first bank 94 of 8 chips establishing an eight bit output and a second bank 95 of 8 chips establishing an eight bit output connected to bus 96. Each chip is similarly constructed with a 12 bit address input connected to an address bus 97 as illustrated, with the connection to one element shown in detail. The address bus 97 also includes the write-read input 98 for correspondingly enabling of the cells.

The memory unit 28 and particularly the memory chips banks 94 and 95 are alternately enabled and driven from a separate TV clock unit 32. The output of the clock unit 32 is thus connected to a clock driver 98 the output of which is connected to simultaneously enable all of the eight RAM chips in either bank 94 or 95. The clock driver 98 thus has a pair of clock outputs 99 and 100 one of which is connected to drive the first bank 94 and the second of which is directed to drive the second bank 95. The clock driver 98 thus toggles between the two banks such that a first word or byte is taken from the first bank, the second byte from the second bank, the third byte from the first bank and so on. A single bank of RAM chips 93 is activated or turned on at any given time. This minimizes the power dissipation in the dynamic RAM construction and permits the memory cells to run at a minimum temperature. The toggle rate is such that each memory bank 94 and 95 is refreshed within the storge period. Similarly the clock driver 98, which requires substantial driving power, is selectively turned off to minimize the energy dissipation during the period or time that neither the CPU 41 or the TV control unit 29 is communicating with the memory unit 28, as subsequently described in connection with the addressing of the memory.

As previously described, the raster TV apparatus consists of a 256 by 224 matrix of display points requiring 7000 words and the scratch pad includes an additional 1000 words. The memory chips 93 thus include a corresponding matrix of memory cells or approximately 64,000 bits. Each chip thus includes approximately 4000 bits. The memory unit 28 is read out in eight bit bytes or words and thus defines eight adjacent points 24 in a scan line 23 on the screen 2. Further, 32 bytes are required to completely define each scan line 23 which as noted is 256 points long, and the memory includes approximately 8000 bytes which are alternately read out, one at a time, from the banks 94 and 95.

In addition to the address bus 97 and data output bus 96, a data input bus 101 is provided forming an extension of the CPU data bus 46 from the CPU multiplexer 69. The bus 101 thus includes write data bit input lines 102 which are connected one each to the input data ports of the corresponding memory chips 93 in the memory banks 94 and 95. The particular cells into which the data is placed is defined by the CPU addressing of the memory unit 28 via the CPU address bus 47.

The RAM 28 as previously noted is selectively addressed from either the TV control unit 29 or alternately from the CPU via the address bus 47. The TV control unit 29 includes a memory address generating means including a horizontal counter 33 and a vertical counter 34 which conjointly define each of the coordinates of the memory cells and related display points 24. The counters 33-34 are shown similarly formed by a pair of clock driven logic chips 104 and 105 such as sold by Intel with identifying number 74161 or 74LS161. The four counter chips are driven from the clock 32 which is connected to a common pulse source with clock 74 and provides sequential addressing of the RAM memories for readout of the cells and display thereof on the screen 2. The output of the counters 33-34 are connected as a set of address lines 100 to one input of the RAM address multiplexer 31, the second input of which is connected to the CPU address bus 47.

The multiplexer 31 is shown as a two to one logic circuit consisting of four 74157 or 74LS147 circuit chips 105, connected to the several elements of horizontal and vertical counters 33 and 34, and to the CPU address bus 47. The output of the multiplexer 31 is an address word 13 bits wide and is connected to the RAM address bus 101. The output thus includes the 12 bits to address the several bit chips in the two banks 94 and 95 and a write-read bit to port 98 to correspondingly enable the member unit 28.

As disclosed herein, the multiplexer in the various connections provides a convenient and practical means of coupling the various input and outputs to a single port. Other means such as latches can, of course, be employed. Further, where the CPU, for example, has sufficient ports the several devices can, of course, be directly coupled without the use of such interfacing devices, with the processor, of course, appropriately programmed to read the ports. These, and other similar concepts, can, of course, be employed within the basic concept herein of using the random access memory unit as the interface between the TV game display unit and the game input controls.

The horizontal clock counter includes a first bit line 106 connected to the parallel to serial data latch 35 via a logic circuit 106a.

As noted previously the clock driver 98 is only driven when the RAM unit 28 is being addressed. The address input words to the memory unit 28 include initial bit lines 107 which are coupled with a driver line 108 from the TV clock unit 29 in a logic circuit 109 to the RAM clock driver 98.

The multiplexer 31 further includes a select input 110 for each unit driven from a select line 111 from the TV clock unit and particularly horizontal clock counter 33. The TV clock unit therefore controls the state of the multiplexer 31 and establishes the priority in which the TV display reading unit has the highest priority. The CPU 41 therefore waits for the TV unit to release the memory unit 28 for communication with the CPU 41. The TV clock unit 29 is also connected to a horizontal blank unit 112 to generate the horizontal blank signal for blanking of the beam 22 during the horizontal resweep time period. A similar vertical blank unit 113 is connected to the clock unit to provide a corresponding vertical blank signal to blank the beam 24 during the retrace time 26. The several sync and blank signals are combined in a logic gate unit 114 having a sync and blank signal summated with the data output on output line 115 in FIG. 5a to develop a combined video and sync control signal connected to the TV screen driver input 22. The line 115 is also connected to the output of the RAM unit 28 through the parallel-to-serial latch unit 35 having its input connected to the RAM data output bus 96.

In the present invention the random access memory 28 and the CPU 41 are driven from the separate clocks 32 and 74 to permit operation of the two units at their maximum speed. The two devices which are preferably selected based on practical consideration such as cost, reliability and the like, do not operate at the same speed in the illustrated embodiment and being totally asynchronous, cannot be conveniently driven from a common clock. For example, in the preferred embodiment, the random access memory unit 28 selected operated at a speed of 800 nonoseconds while the CPU 41 operated at 500 nanoseconds. It is desirable to maintain the operation at its maximum speed to provide maximum available time to unit 41 in view of the significant number of tasks assigned and which are completed in order to create optimum presentation.

The output of the RAM unit 28 appears on the data output bus 96 by encoding of the write/read lines 98 to read. The data output bus 96 connects to a CPU latch 117 of the display latch means 65 in FIG. 2. The data latch 117 includes a parallel to parallel latch unit shown consisting of a pair of LS174 register latches. The display latch means 35 is a parallel to serial number 166 latch unit.

The serial to parallel latch 35 has its select line 118 connected by a logic circuit 119 to the horizontal and vertical counters 104 and 105 and its clock port and line 120 connected via logic unit 106a to the counter line 106 of the TV display clock system. The TV clock system thus enables the latch 35 to store the eight display bits and to serially transmit the bits from the serial output port and line which is connected to the TV input signal line 115 and thus to port 22. The TV clock counters outputs are connected to the sync and blank logic circuit having the sync and blank output line which is summated with the data line at line 115 to form the common input to the TV input port of FIG. 2.

In FIG. 5, a horizontal blank flip-flop logic gate 112 and a vertical blank flip-flop logic gate 113 are set by the counters. The outputs are combined in the logic circuit 114 to establish the appropriate blanking signals.

Under normal sequencing operations, the TV clock system drives the addressing counters 33 and 34 to sequentially address the memory locations, clocks the memories to transfer the data into the parallel to serial latch 35. When the 8 bits of information are transferred into the latch the memory unit 28 is released for use by the CPU.

During this period, the parallel to serial latch 35 is outputted in synchronism with the TV sync and blank signal from logic unit 114 to the television set 21 for correspondingly energizing of the scanning beam 22 in accordance with the information stored in memory. The parallel to serial latch 35 is clocked in synchronism to maintain proper synchronism between the transmittal of information and the positioning of the scanning beam 22. At the end of transmission of the eight data bits, the TV clock and addressing system automatically accesses the RAM unit 28 to read the next display data byte and transfer it to the parallel to serial latch for another display of such successive byte.

In the illustrated embodiment of the invention with eight bit wide bytes, 32 bytes are read for each horizontal scan line. At the end of the line, the horizontal blanking signal is set by flip-flop register 112 and the beam is blanked during the horizontal retrace time. A new scan line cycle is again initiated with the horizontal counter and the vertical counter appropriately adjusted for generating the addresses for the new line.

As previously noted, the TV control has a priority in the hierarchies of the operating system. When the CPU 41 requests access to the RAM memory, the CPU 41 must wait until the TV control unit releases the memory unit 28. The CPU 41 operates at a slower speed and after access to memory unit 28 is captured does not actually execute the step until the RAM introduces a signal indicating the synchronous state of the units and particularly that the data is on the input of the decoder. The CPU 41 may address the memory unit 28 while the TV display control is also addressing the memory unit 28. When the TV display control releases the memory unit 28, the multiplexer 31 connects the CPU address bus 47 to the RAM address bus 97 and the appropriate eight bits of memory data appear on the data bus 96. The data is placed on the inputs to the CPU parallel to parallel latches 117 and are latched by a synchronizing logic circuit 121.

The synchronizing logic circuit 121 is enabled by the CPU 41 request for data from memory and when the data information is latched, the logic circuit 121 transmits a ready signal to the ready port 70 of the CPU unit 41 via a line 122. the CPU 41 then terminates the "wait" state and proceeds to execute the program for which the data was requested.

The memory unit 28 is directly released to the CPU 41 between each of the display data bytes as well as during each of the horizontal and vertical beam retrace periods. Thus, during these periods the CPU 41 may address the scratch pad portion of the memory units 28.

The pair of LS174 latch registers 117 provides additional input-output logic and lines in addition to the eight data lines. The available portion of the latch which signals the synchronizer indicates to indicate the condition of the latches and particularly the readiness to transmit data to the CPU 41. When the CPU 41 has requested communication with the memory unit 28 and receives the ready signal, the appropriate instruction is forwarded to the decoder 80 to transfer the data through the multiplexer 69 to the data inputs of the CPU 41.

In addition, the CPU 41 interrupt 71 is set periodically to initiate updating of the symbols. In the illustrated embodiment of the present invention, the TV display control unit 29 and particularly the clock system is connected to an interrupt logic circuit 123 to generate a pair of update interrupts. The one interrupt occurs at the middle of a display frame and the second interrupt occurs at the end of the display frame. The first interrupt provides for updating symbols in the upper half of the screen 2 and the second interrupt for updating symbols in the lower half of the screen 2. The interrupt is binary encoded on a pair of interrupt encoded lines 124 and 125 from the interrupt logic circuit 123. The encoded lines are connected to fourth input 88 of decoder 80. A line 127 is connected to an interrupt latch 126, shown as a LS174 flip-flop, the second of which is connected to the interrupt part of the CPU 41.

The CPU 41 reads the interrupt input of the decoder 80 to determine which interrupt is being processed for appropriately updating of the symbols of the gunfighter 3 and 4.

By initiating the interrupt signal for the upper portion of the screen after writing of such portion, the CPU 41 has the period during the writing of the lower portion of the screen to execute the various tasks for writing of the new symbols. Thus, the CPU 41 may communicate with memory units during the TV idle time. Further, as noted previously, the duty cycle of the next scan frame is employed as the time available to complete the updating of the one symbol. If the upper screen does not contain a symbol requiring updating, the CPU 41 acknowledges the interrupt and proceeds to other tasks. Upon generation of the second interrupt, the CPU 41 initiates the update program for the lower portion of the screen 2. Thus, by employing the dual interrupt the total available update cycle time is increased.

The required updating is determined by the operation of the control means 15 and 16 by the players, as well as other special interrelated controls as shown in the game logic board of FIG. 6.

Referring particularly to FIG. 6, the game logic board generally includes multiplexer 87 for transmitting of the setting of control means 15 and 16 and other game inputs to the CPU 41 and for driving of the reinforcing visual and sound devices 45*a*. Additionally, a special data bit shifter 128 is provided for selectively shifting of the bits in a symbol byte to properly define a symbol, as hereinafter developed. More particularly, the various control switches 48, 50–54 and 60–63, as shown in FIGS. 3 and 4, for the gunfighter 3 and 4 are coupled as first and second sets of inputs 129 and 130 of the four to one multiplex 87 which has its output lines 131 connected to bus 86 to the CPU decoder 80 of FIG. 5. The third input 132 of the multiplexer 87 receives game condition control data from a bank of manually set switches 133. Finally, the pattern or symbol byte shifter circuit or unit 128 is connected to the fourth input 134 of the multiplexer 87. The CPU data bus is connected to the shifter 128 and to an output signal latch 135.

In the illustrated embodiment, the multiplexer 87 and the shifter 128 and an output reinforcing latch register unit 135 are coupled to the CPU 41 through three bit address lines 136 driven from the CPU 41. The three input bit lines 136 have two inputs to the multiplexer 87 for selecting one of the four inputs to be transmitted over the right bit output lines 131.

The two address lines 136 connected to select inputs of the decoders provide binary encoding of the multiplex unit 87 for selective coupling of the output lines 131 to any one of the eight lines of the four inputs 129–134 and thereby permit the sequential transfer of data and information to and from the central processor unit 41 for the lines 136 are also connected to the shifter 128 and to the latch 135 through logic gates 137 as clock lines for appropriate transfer of data to and from the CPU 41. The data decoder or multiplexer 87 is shown formed from four LS153 register units 139 each of which includes a pair of four input decoding units and thus provides a total of eight input signal bits for each of the four data multiplexed inputs and a corresponding eight output signal bits connected to lines 13.

The user operated control means 15 and 16 each provide eight input signals, in the form of open or closed switches, defining the complete demanded change of a player. The several input signals are shown connected to the several inputs via suitable pulse shaping circuits 140, such as suitable opto-isolators. The switches of controls 15 and 16 are similarly connected to the first and second bank of inputs 129 and 130. The connections for control 15 are described for purposes of description.

More particularly, the raise switch 61 for gunfighter 3 is connected to the corresponding first input. The closing of the switch 61 generates a suitable logic pulse as an output binary logic signal which is read by the processor upon encoding of the multiplexer to output the data for gunfighter 3.

The downward movement switch 63 for the gunfighter 3 is connected to the second line of the first decoder input and the right and left movement switches 60 and 62 are connected to the third and fourth lines of such first input 129. The three coding switches 52, 53 and 54 for the position of the gunfighters arm 19 are similarly connected to the multiplexing fifth, sixth and seventh lines of input 129. The eighth line of the first input 129 is connected to the trigger switch 48 for firing of bullet 6 by gunfighter 3. When the CPU 41 program steps to read the controls, the address lines 136 encode the multiplexer to output the signals on the first input which are thus transmitted via lines 131 and the bus 86 to the corresponding input 85 of the CPU encoder 80. The CPU 41 reads the data via the multiplexer 69 and the data read/write data lines 68 for appropriate processing and updating of the memory unit 28.

The second input 130 similarly provides for reading of the actuation of the control means 16 for gunfighter 4.

The eight lines of the third input 132 of the multiplexer 87 are coupled to coin and game time control switches, as presently described, and set the conditions for initiating and continuing of play. A pair of coin switches 141 and 142 permit encoding of the game to require insertion of anywhere from one to four coins in the coin receiver 14 to condition the game for operation. Thus, the pair of switches may provide a series of binary codes requiring one, two or three coins to condition the game for play. The switches 141 and 142 are connected to the first and second lines of input 132 and to a logic supply circuit 143.

Credit for proper coinage input as set by switches 141 and 142, is determined by a pair of switches 144 and 145 connected to the third and fourth lines of the third input 132. The switches 144 and 145 similarly provide encoding of game credits for any given number of coins. CPU 41 maintains a continuous record of the number of coins introduced and the number of games remaining to be played before all of the inserted coinage have been used up.

A further pair of switches 146 and 147 permits encoding of the game into different playing times. The switches are shown connected to the fifth and sixth lines of the third input 132. A nominal minimum game period might exist for 60 seconds but it might well be desired to extend the games to 90 or 120 seconds.

The seventh and eighth lines of the third input 132 are connected to signal logic inputs 148–149 related to receipt of a proper coin and the initializing of the processor system for initiating the game time. The coin input switch signal is derived from the coin input unit 14 to ensure starting from an initial position. Thus, each inserted coin is recorded in a suitable register, not shown, and the game apparatus enabled in accordance with the coin setting and credits condition proscribed by the switches 144–147.

Finally, the eight lines of the fourth input 134 of multiplexer 87 is connected to the eight output bit lines 150 of the data shifter unit 128.

The shifter 128 is a variable bit shifting means for rapid shifting of the bits in a data word or byte by a program control amount. The shifter 128 is employed to shift the symbol word bits where the positioning of the symbols is offset from actual byte distribution across the screen. Thus, each symbol is encompassed within a block of scan points. Thus, relatively large symbols such as the gunfighter and wagon may be three bytes wide. The screen 2 and memory unit 28 are similarly 32 bytes wide. If the symbol side limits coincide with the limits of any three bytes, the symbol could be directly placed and removed from memory. Such may infrequently occur. Generally, however, the symbol will be shifted by anywhere from one to seven bits and the three symbol defining bytes are spread over four adjacent memory and screen bytes. The symbol bits must then be shifted to properly locate the symbol bits in memory unit 28. Although the CPU 41 can include the appropriate software program to provide the necessary shift, such an approach would unduly burden the CPU and in particular absorb an unacceptable amount of processor time for the commercially practical apparatus such as shown for the preferred embodiment.

The illustrated shifter 128 includes a pair of cascaded latch stages 151 and 152 in which first and second sequential bytes of data are sequentially placed. The outputs appearing at lines 150 are derived from the 16 output bits of such two bytes to provide a byte with the bits shifted. The amount of shift, up to seven bits, is set by a latch unit 153 which is programmed by the CPU 41 in accordance with the desired location of the symbol on the screen 2. More particularly, the first shifter stage 151 includes four separate LS175 latches 154, each having up to six inputs, two of which are derived from the CPU data bus 68. The output lines 155 of the first stage are connected as inputs to the second stage 152 and also back to other inputs of the first stage as at 156 to develop additional inputs to the second stage 152. The two outputs of the first stage 151 are thus paralleled and the output of the second stage 152 define the complete 16 bits of adjacent display bytes. The second stage 152 is shown including four similar decoders 157 identified by the number AMD25S10 having eight input bits and four output bits. The decoders 157 have three bit selection code lines 158 connected to the CPU programmed shift latch 153.

The CPU 41 thus calculates the amount of shift required and correspondingly sets the latch register 153. The data bits are each byte are then directly shifted accordingly as a result of the hardwired instruction that the signal bits appearing at the particular input ports are taken out at a different and properly shifted output port. The eight bit shifted byte is transmitted to the CPU 41 via the data multiplexer 87 and the output lines to the CPU bus 86. This is an extremely practical consideration where large amounts of shift will be required such as where a large number of symbols are used or where each symbol is large such that reasonably large shift values may be required. Thus, a symbol may require up to 100 data bytes, each of which is to be shifted. In the illustrated embodiment, when updating the memory, the latch 153 is set once and the symbol bytes are each directly properly shifted. If a software program were employed, the processor time would be so extreme as to prevent a desirable display, and particularly where larger values of shift were required.

The shifter 128 therefore particularly adapts the system to the use of a relatively slow and therefore commercially practical processor 30.

The visual and audible outputs are transmitted to the output latches 135 from the CPU data bus 68 and the connected game logic board lines 151.

The output of the one latch 135 is connected to a decoder 159 having six individual drivers to a sound generator 160 for driving a pair of speakers 161 and 162. Thus, each firing of a bullet may generate a programmed sound. The second latch 135 provides for driving of miscellaneous recorders and indicators in accordance with the game program. The second latch 135 is shown for example developing outputs for driving of a coin counter 163, a credit counter 164 and a game over lamp 165.

The circuits shown in FIGS. 5 and 6 thus provide a preferred embodiment for the gunfighter game. The circuits can, of course, be readily adapted to any other game by merely providing an appropriate programming of the CPU program memory unit 42 and providing of the necessary modification to the game logic circuits for the input and output signals required for such game.

The preferred embodiment includes various unique features which are significant in the construction of a basic system for many different games. Various modifications of this preferred embodiment may of course be incorporated. For example, if the tasks required of the processor are not as great as in the illustrated game, or a higher speed processor is used, each of the scan frames may be used for display to develop a greater resolution in the symbols. Similarly, the shifter is most important where large symbols are used requiring large amounts of shifting. Consequently, such detail may be eliminated and a software program shift employed if desired. If the processor and RAM memory unit operate at the same or some even multiple of time, a single clock may be employed. These and similar other important features may or may not be employed based on the particular game and time parameters. In summary, in the implementing of the invention, various processor and display control of any desired design may be employed which are adapted to essentially independent operation with a random access memory and where the random access memory functions as the interfacing means for providing interdependent functional relationships in the playing of the game apparatus.

In the illustrated embodiment of the invention, various multiplexing units are employed for establishing multiple inputs and outputs to the processor and to the memory. Although multiplexers employ a very convenient structure where the associated devices have limited input and output ports, the present invention can be employed with direct port connections where available. Thus, a processor might be employed with individual ports connected directly to the data and address channels with the appropriate internal latches and selection.

In the illustrated embodiment of the invention, a single memory is provided to provide the game presentation in black and white. The game apparatus can be directly modified for colored presentation. In this aspect of the invention, three memory planes would be employed, one for each of the basic colors with a master controller to provide the necessary and desired interrelationship of the reading of the various planes. Further, if desired, the color could be basically shades of gray with each dot provided with more than one identifying bit of intersity memory. If such concept were employed to the color schematically there would be three memory planes for each color. Further, within the broad concept various processors could be employed for the various functions with the intelligence requirements distributed in a logical manner and under the control of a master controller or processor. In multiple systems, for example, a microprocessor might be employed to control the bit shift depending upon the relative time and costs requirements.

The illustrated embodiment of the invention as well as the suggested modifications and the like are all directed to practical implementation of the very basic concept of employing the duly addressed memory means which functions as a direct and unique interfacing between the player operated game controllers and the like to and with the completely separately operated display means. As previously noted, this separation of the game into two distinct separate components operating as separate entities and with the memory as the only common interfacing not only permits a relatively low cost, versatile game apparatus but uniquely adapts such TV game apparatus to a simple, inexpensive and readily implemented conversion of a basic structure to various games.

The illustrated embodiment provides a highly significant improvement in the practical implementation with present day technology but the various steps and functions may, of course, employ any other suitable apparatus which can provide the desired functioning.

The present invention thus provides a reliable and relatively inexpensive TV game apparatus particularly adapted to commercial production.

Various modes of carrying out the invention are contemplated as being within the scope of the following claims particularly pointing out and distinctly claiming the subject matter which is regarded as the invention.

I claim:

1. A player-operated game apparatus for use with a display screen means having an intensity control means for varying the intensities of picture elements for the presentation of movable symbols on a screen, said apparatus comprising player-operated means including input elements adapted to be operated by a player and signal means actuable by said input elements for affecting the display of symbols and initiating interaction of the player with the symbols on the screen; random access memory for storing in a digital form a set of digital bits representing the intensities necessary for generating a display on said screen and locating the symbols within the display; display controller means for addressing said random access memory and reading the set of bits in the random access memory in time-spaced read periods separated by reading idle periods, in each of which read periods one or more bits associated with a desired display are read from the random access memory, said display controller means being adapted for connection to said intensity control means of the display means to transmit the bits to said intensity control means to present the desired display stored in said random access memory; a microprocessor; program means; communicating port means for connecting the signal means of the player-operated means to the microprocessor; said microprocessor having means for accessing said program means and means for reading from and writing to said random access memory to represent symbols in response to said signal means and said program means wherein the microprocessor revises and controls interaction of the symbols within the display; control means operatively coupling the random access memory to the microprocessor during said reading idle periods to change said random access memory between said read periods; means for reading bits associated with the desired display from the random access memory in parallel groups defined by a predetermined number of bits during each of the reading periods; serializing means serially transmitting a parallel group of bits to the intensity control means; said means for reading from and writing to said random access memory including means for accessing the random access memory a parallel group of bits at a time whereby the microprocessor modifies digital bits in the random access memory a parallel group of bits at a time; shifting means operatively coupled to the microprocessor for receiving therefrom parallel groups of bits, and for shifting the bits of the parallel groups of bits a number of bit positions as determined by the microprocessor; and means for transferring the parallel groups of bits so shifted from the shifting means to the random access memory so that smooth appearing continuous movements of the symbols on the display is provided.

2. A player-operated game apparatus for use with a display screen means having an intensity control means for varying the intensities of picture elements for the presentation of movable symbols on a screen, said apparatus comprising player-operated means including input elements adapted to be operated by a player and signal means actuable by said input elements for affecting the display of symbols and initiation interaction of the player with the symbols on the screen; random access memory for storing in a digital form a set of digital bits representing the intensities necessary for generating a display on said screen and locating the symbols within the display; display controller means for addressing said random access memory and reading the set of bits in the random access memory in time-spaced read periods separated by reading idle periods, in each of which read periods one or more bits associated with a desired display are read from the random access memory, said display controller means being adapted for connection to said intensity control means of the display means to transmit the bits to said intensity control means to present the desired display stored in said random access memory; a microprocessor; program means; communicating port means for connecting the signal means of the player-operated means to the microprocessor, said microprocessor having means for accessing said program means and means for reading from and writing to said random access memory to represent symbols in response to said signal means and said program means whereby the microprocessor revises and controls interaction of the symbols within the display; control means operatively coupling the random access memory to the microprocessor during said reading idle periods to change said random access memory between said read periods; and processing means operatively coupled to the microprocessor for receiving therefrom control signals and symbol signals representative of a symbol to be displayed on the display, the control signals activating the processing means for transforming the symbol signals to produce transformed symbol signals so that a symbol represented by the transformed symbol signals is different than a symbol represented by the symbol signals relative to the display, and for providing smooth appearing continuous movement of the symbols on the display.

3. A player-operated game apparatus for use with a display screen means having an intensity control means for varying the intensities of picture elements for the presentation of movable symbols on a screen, said apparatus comprising player-operated means including input elements adapted to be operated by a player and signal means actuable by said input elements for affecting the display of symbols and initiating interaction of the player with the symbols on the screen; random access memory for storing in a digital form a set of digital bits representing the intensities necessary for generating a display on said screen and locating the symbols within the display; display controller means for addressing said random access memory and reading the set of bits in the random access memory in time-spaced read periods separated by reading idle periods, in each of which read periods one or more bits associated with a desired display are read from the random access memory, said display controller means being adapted for connection to said intensity control means of the display means to transmit the bits to said intensity control means to present the desired display stored in said random access memory; a microprocessor; program means; communicating port means for connecting the signal means of the player-operated means to the microprocessor; said micrprocessor having means for accessing said program means and means for reading from and writing to said random access memory to represent symbols in response to said signal means and said program means whereby the microprocessor revises and controls interaction of the symbols within the display; control means operatively coupling the random access memory to the microprocessor during said reading idle periods to change said random access memory between said read periods; interrupt signal means for generating a pair of interrupt sigals which divides the screen into two parts, means for connecting the interrupt signal means to the microprocessor for transferring the pair of interrupt signals thereto so that digital bits of the random access memory representative of one part of the screen can be revised while digital bits of the random access memory representative of the other part of the screen are read to the intensity control means.

4. The apparatus according to claim 2 or 3 wherein during each of the reading periods bits associated with the desired display are read from the random access memory in parallel groups defined by a predetermined number of bits.

5. The apparatus according to claim 1, 2 or 3 wherein said display controller means further includes a memory address generating means and a control signal means for signaling the initiation of a read period; said microprocessor includes a memory address bus; and said control means comprises an address multiplexer operatively coupled to the random access memory and also operatively coupled to the memory address generating means of the display controller means and to the memory address bus of the microprocessor and operatively coupled to the control signal means of the display controller means to control the coupling of the random access memory to the display controller means and to the microprocessor so that said display controller means can address said random access memory during said read periods and said microprocessor is operatively coupled to said random access memory only during said reading idle periods.

6. The apparatus of claim 5 wherein each group of bits in the random access memory has an address and the memory address generating means comprises a plurality of counters for generating sequential memory addresses whereby each group of bits may be addressed and read in sequential fashion.

7. The apparatus of claim 6 wherein the set of bits in the random access memory is arranged in matrix form so that each plurality of bits has a horizontal and a vertical address and the plurality of counters includes a horizontal counter for generating the horizontal address and a vertical counter for generating the vertical address of each plurality of bits.

8. The apparatus of claim 7 wherein said display means includes a screen having a matrix pattern defined by pluralities of dots, said plurality of dots each having horizontal and vertical coordinates on the screen corresponding to the horizontal and vertical addresses of a plurality of bits in the random access memory.

9. The apparatus according to claims 1, 2 or 3 wherein said program means includes symbol memory means having a set of bits representing the intensities necessary for generating for each symbol a display of said symbol on said screen.

10. The apparatus of claim 9 wherein a symbol has a plurality of different poses, said symbol memory means having a set of digital bits representing the intensities necessary for generating a display of the plurality of poses on said screen for said symbols having a plurality of poses.

11. In the apparatus of claim 1, wherein a group of bits comprises a byte and two successive bytes are read from the microprocessor to the shifting means, said shifting means comprising means for shifting the two bytes and for selecting appropriate bits from the two bytes to form an appropriate byte to store in the random access memory.

12. The apparatus of claim 11 wherein said symbols are defined by a selected block within the random access memory, at least one of said symbols and blocks being a plurality of bytes wide, said shifting means comprising a hardwired bit shifter for shifting the bits in a byte for transfer to a block within said random access memory and having shift level means for setting the number of bit shifts for each byte; said microprocessor being connected to the shift level means and setting said shift level means for the number of bit shifts to locate the bits in the proper random access memory blocks.

13. The apparatus according to claims 1 or 1, 6 wherein said display controller means includes an interrupt signal means; said microprocessor including interrupt port means connected to the interrupt signal means; and said microprocessor being responsive to said interrupt signal means for writing of bits associated with a symbol in the random access memory.

14. The apparatus fo claim 13 wherein the display means generates time-spaced display frames, and the microprocessor erases the bits associated with a symbol and writes in the random access memory bits associated with a symbol during periods of alternate frames.

15. The apparatus of claim 13 wherein said display controller means includes a sync and blank signal means for blanking the scanning beam during horizontal and vertical retrace, said reading idle period occurring during said horizontal and vertical retrace, and a clock means connected to actuate the sync and blank signal means and the interrupt signal means.

16. The apparatus according to claim 1, 2 or 3 comprising means for operating said display controller means at a first rate and means for operating said microprocessor at a second rate whereby said microprocessor can operate at a relatively slow rate while maintaining a relatively complete and accurate presentation of a symbol moving within the display on a relatively high speed raster scan screen.

17. The apparatus of claim 1 further including a data latch means for latching a plurality of bits from the random access memory to the microprocessor, and a synchronizing means controlled by the display controller means for setting of said latch means; said microprocessor having a wait state established in response to a request for the random access memory and having a ready port connected to said synchronizing means; and said synchronizing means having means connected to the ready port of the microprocessor for producing a ready signal upon the completion of setting of the latch means.

18. The apparatus according to claims 1, 2 or 3 wherein said random access memory includes a plurality of additional locations defining a scratch pad memory means.

19. The apparatus of claim 18 wherein a symbol may have a plurality of different poses, each of which is stored as bits in the program means; and said microprocessor includes means for storing a representation of a last written symbol pose in the scratch pad memory means, for calculating a new symbol pose, and for storing bits representing the new symbol pose in said random access memory, whereby the symbol in the display is repositioned and redrawn to simulate realistic symbol movement.

20. The apparatus of claim 19 wherein said microprocessor in representing a new presentation of a symbol in the random access memory has means for completely erasing the bits of the previous symbol and for storing the bits of the new presentation of the symbol.

21. The apparatus according to claim 1, 2 or 3 wherein said microprocessor includes vectoring means for storing reference data for selected symbols in a previous display frame, and said microprocessor having means for storing bits representing a new symbol in said random access memory in accordance with the actuation of said signal means of the player-operated control means to move said symbols within the display in accordance with the movement of the player-operated means and the presentation in the previous display frame.

22. The apparatus according to claim 1, 2 or 3 including sets of player-operated means for each player, and having a game logic multiplexer having a plurality of multiple bit input means and a multiple bit output, each of said input means being connected to sample one set of said player-operated means in response to the microprocessor.

23. The apparatus of claim 1 wherein the serializing means comprises a parallel-to-serial latch.

24. The apparatus of claim 1 wherein the shifting means includes two cascaded latch stages.

25. The apparatus according to claims 1, 2 or 3 wherein the random access memory includes dynamic memory means for each location within said random access memory, said dynamic memory means being separated into a plurality of groups each of which groups produces said plurality of bits, and a clock driver for sequentially and cyclically enabling said plurality of groups.

26. The apparatus according to claims 1, 2 or 3 wherein said random access memory includes a plurality of memory chips arranged in columns, each column including a chip for each bit of the group of bits read, said memory chips being dynamic memory chips, a driver being connected to the chips in each column for alternately refreshing and enabling the columns of memory chips, and a logic means connecting said driver to said addressing means for refreshing and enabling of said columns of memory chips during the read periods so that a group of bits may be read from a column of memory chips during a read period.

* * * * *

UNITED STATES PATENT AND TRADEMARK OFFICE
CERTIFICATE OF CORRECTION

PATENT NO. : 4,296,930

DATED : October 27, 1981

INVENTOR(S) : Jeffrey E. Frederiksen

It is certified that error appears in the above—identified patent and that said Letters Patent is hereby corrected as shown below:

In "Other Publications", change "Di Ophir, S., et al." to --D. Ophir, S., et al.--

Column 1, line 49, change "handwired" to --hardwired--.

Column 2, lines 20-21, change "retract" to --retrace--.

Column 2, line 38, change "permited" to --permitted--.

Column 2, line 52, change "Generlly" to --Generally--.

Column 4, line 23, change "peiod" to --period--.

Column 4, line 50, change "conventioal" to --conventional--.

Column 5, line 64, change "display" to --play--.

Column 6, line 40, change "mvoe" to --move--.

Column 7, line 61, change "sutiably" to --suitably--.

Column 8, line 39, change "rewritting" to --rewriting--.

Column 8, line 43, change "As" to --An--.

UNITED STATES PATENT AND TRADEMARK OFFICE
CERTIFICATE OF CORRECTION

PATENT NO. : 4,296,930
DATED : October 27, 1981
INVENTOR(S) : Jeffrey E. Frederiksen It is certified that error appears in the above—identified patent and that said Letters Patent is hereby corrected as shown below:

Column 9, line 36, change "distrubuted" to --distributed--.
Column 9, line 57, change "bianry" to --binary--.
Column 10, line 62, change "resposition" to --reposition--.
Column 11, line 40, change "illustrating" to --illustration--.
Column 12, line 7, change "continuosly" to --continuously--.
Column 12, line 10, change "he" to --the--.
Column 12, line 57, delete "is".
Column 13, line 5, change "aplied" to --applied--.
Column 14, line 5, change "storge" to --storage--.
Column 15, line 37, change "RA M" to --RAM--.
Column 15, line 49, change "nonoseconds" to --nanoseconds--.
Column 15, line 56, change "lines" to --line--.
Column 16, line 63, change "the" to --The--.
Column 17, line 6, after "synchronizer" insert --,--, and delete "to indicate".

UNITED STATES PATENT AND TRADEMARK OFFICE
CERTIFICATE OF CORRECTION

PATENT NO. : 4,296,930
DATED : October 27, 1981
INVENTOR(S) : Jeffrey E. Frederiksen It is certified that error appears in the above—identified patent and that said Letters Patent is hereby corrected as shown below:

Claim 2, column 22, line 64, change "initiation" to --initiating--.
Claim 3, column 23, line 59, change "micrprocessor" to --microprocessor--.
Claim 3, column 24, line 1, change "sigals" to --signals--.
Claim 13, column 25, line 12, change "1 or 1, 6" to --1 or 2--.
Claim 14, column 25, line 19, change "fo" to --of--.
Claim 16, column 25, line 31, change "claim" to --claims--.
Claim 21, column 26, line 14, change "claim" to --claims--.
Claim 22, column 26, line 24, change "claim" to --claims--.

Signed and Sealed this

Twenty-seventh Day of March 1984

[SEAL]

Attest:

GERALD J. MOSSINGHOFF

Attesting Officer

Commissioner of Patents and Trademarks